(No Model.)　　　　　J. E. SCHMALZ.　　　5 Sheets—Sheet 3.
CIGAR MACHINE.

No. 246,219.　　　　　　　Patented Aug. 23, 1881.

(No Model.)     J. E. SCHMALZ.     5 Sheets—Sheet 4.
CIGAR MACHINE.

No. 246,219.     Patented Aug. 23, 1881.

WITNESSES
Fred. G. Dieterich
P. C. Dieterich

INVENTOR
John E. Schmalz
by A. M. Tanner
Attorneys

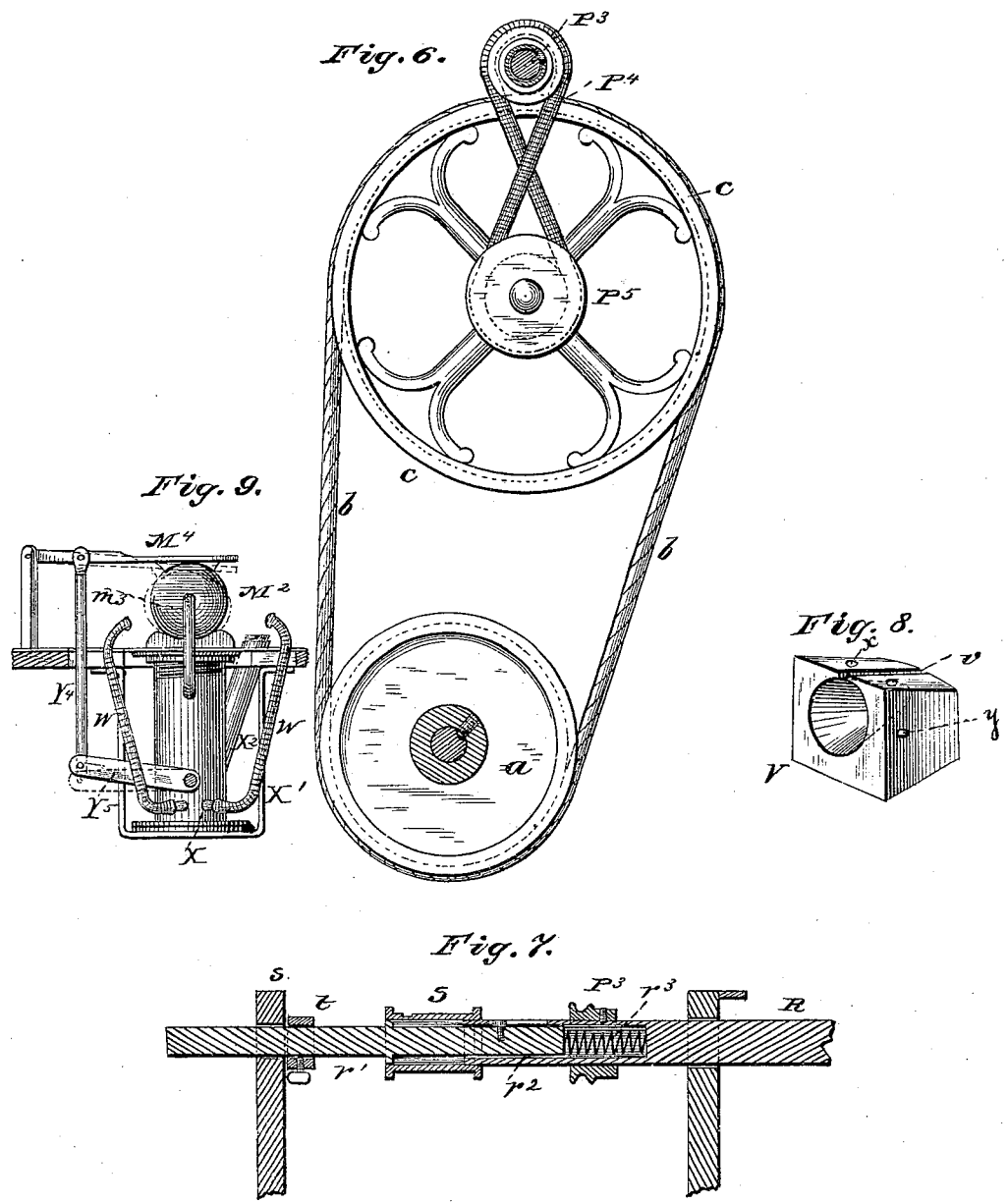

UNITED STATES PATENT OFFICE.

JOHN E. SCHMALZ, OF NEW ORLEANS, LOUISIANA, ASSIGNOR OF ONE-HALF TO SIMON J. FLATOW, OF SAME PLACE.

CIGAR-MACHINE.

SPECIFICATION forming part of Letters Patent No. 246,219, dated August 23, 1881.

Application filed June 29, 1881. (No model.)

*To all whom it may concern:*

Be it known that I, JOHN E. SCHMALZ, residing at New Orleans, in the State of Louisiana, have invented certain new and useful Improvements in Cigar-Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to that class of machines for wrapping and finishing cigars in which an endless apron traveling through a mold or form serves to rotate the cigar-bunch for causing the wrapper to be wound around the same.

The object of the invention is to provide a machine which will permit cigars of varying sizes to be wrapped and finished with greater ease and facility than in machines heretofore devised, and will also enable all kinds of wrappers to be applied without injury thereto. Special provision is also made for permitting two operators located on opposite sides of the machine to control or operate the same and to supply the machine, respectively, with right and left hand wrappers, so that the operation of wrapping cigars is greatly expedited.

The invention consists in the construction and combination of devices which will hereinafter be more fully described, and then set forth in the claims.

Figure 1:
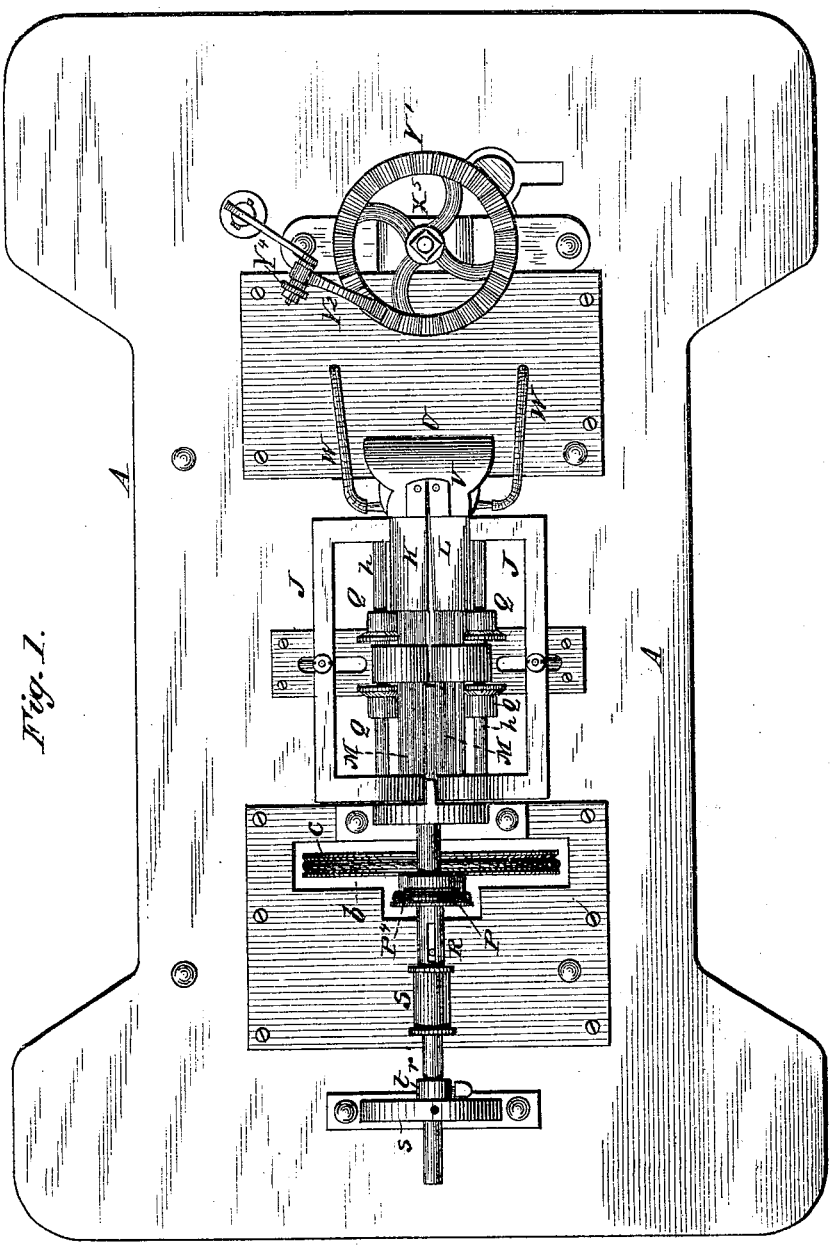
Figure 2:
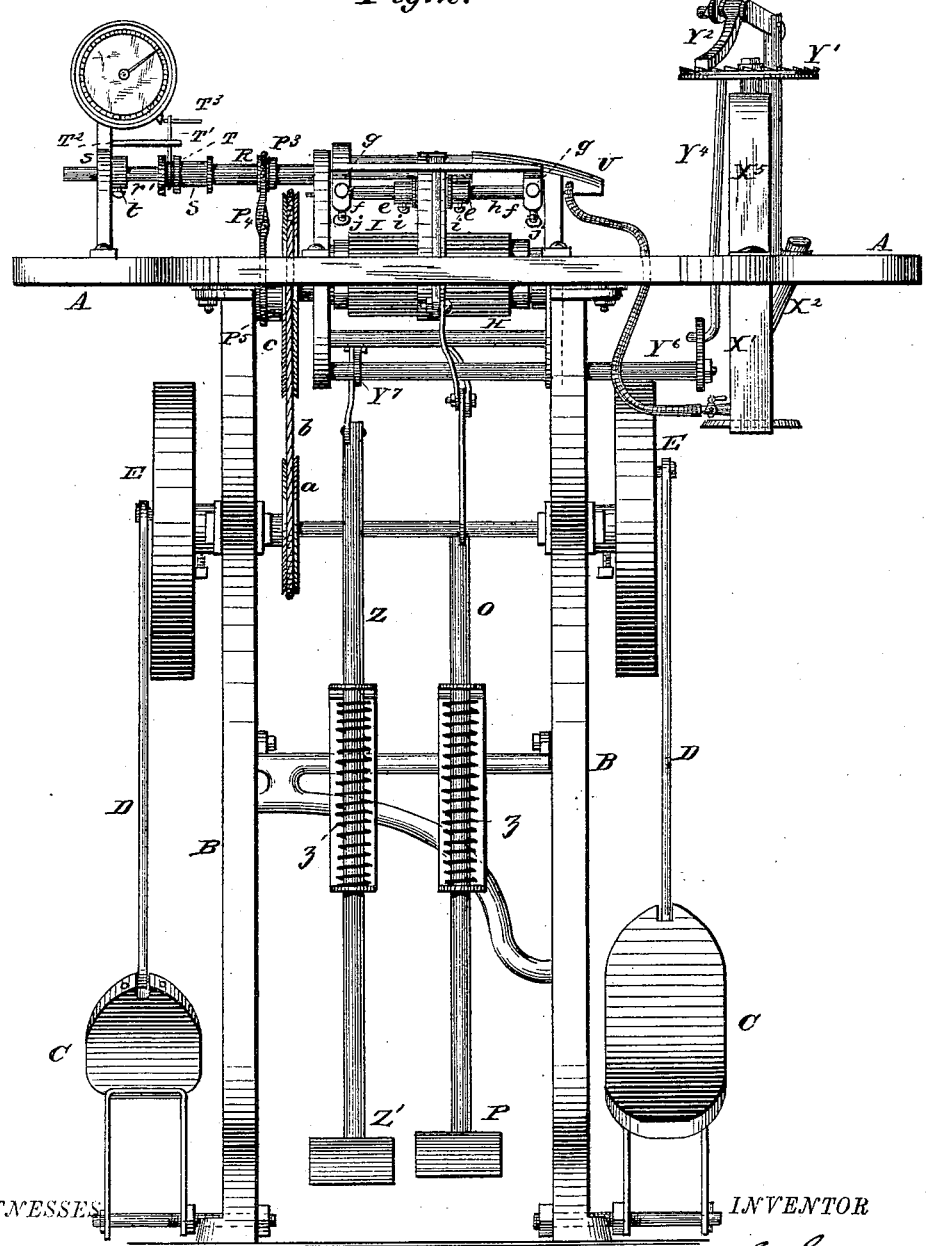
Figure 3:
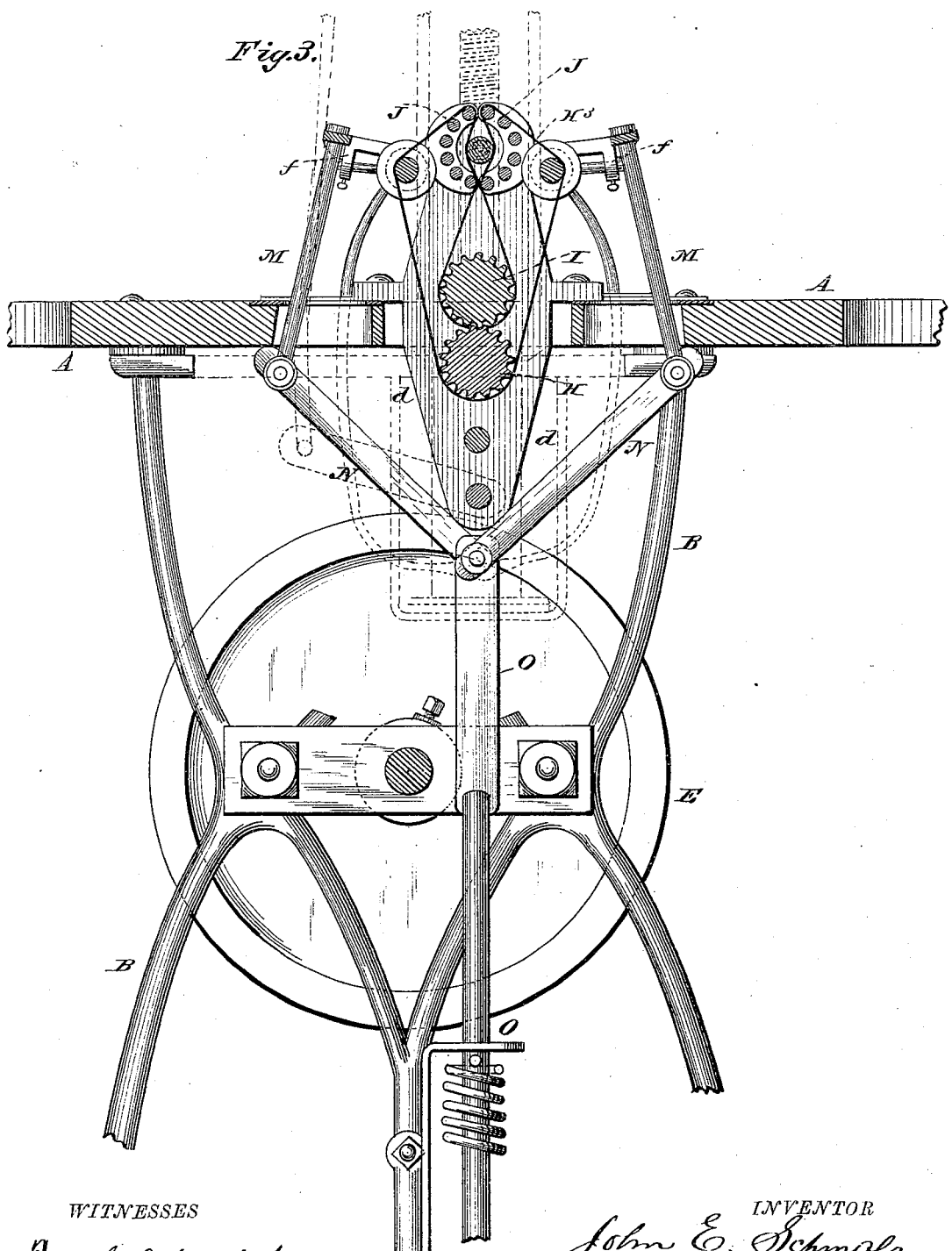
Figure 4:
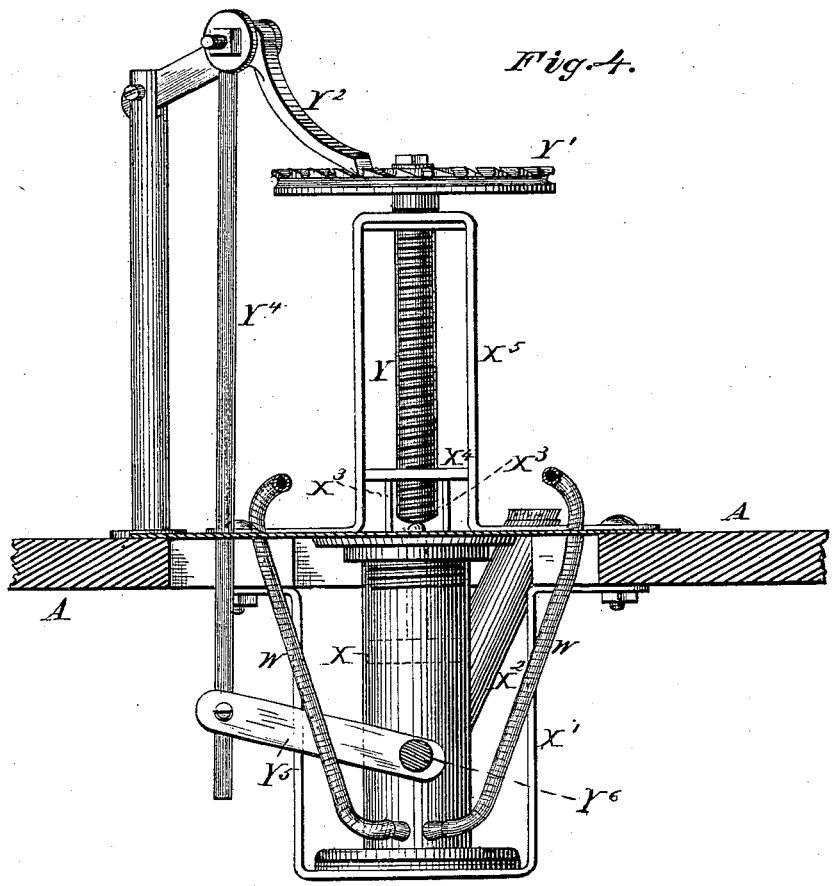
Figure 5:
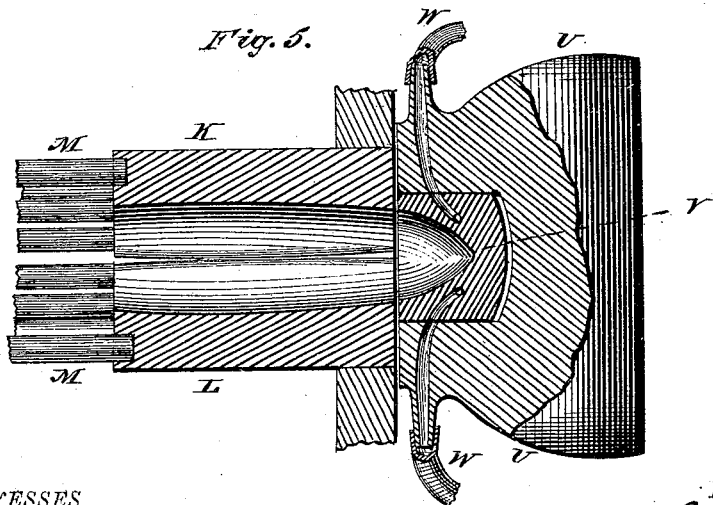

In the drawings, Figure 1 is a plan or top view of a cigar-machine constructed according to my invention. Fig. 2 is a side elevation of the same. Fig. 3 is a vertical sectional view. Fig. 4 is a detail view of the devices for supplying paste to the tip-former of the machine. Fig. 5 is a detail sectional view of said tip-former and a portion of the mold or shell for receiving the cigar-bunch. Fig. 6 is a detail view of the pulley and elastic-belt mechanism for operating the adjustable regulator or mandrel revolving in contact with the butt of the cigar-bunch. Fig. 7 is a sectional view of said regulator or mandrel. Fig. 8 is a detail view of the tip-former or finishing-block. Fig. 9 is a modification exhibiting an elastic or compressible air-bulb for forcing the paste from the reservoir.

The letter A designates a table, which is made sufficiently wide to permit two operators, located on opposite sides thereof, to properly present the cigar-wrappers to a wrapping and finishing mechanism arranged longitudinally above the table-bed, and to alternately introduce a cigar-bunch into the machine and remove a finished cigar therefrom. In this manner two operators supplied respectively with right and left hand wrappers can operate the machine continuously and perform a greater amount of work than if changes had to be made for adapting the machine first for right-hand and then for left-hand wrappers, as has heretofore been proposed.

The stand or frame-work B of the machine is of any approved form and size, and supports a compound-treadle mechanism for operating the wrapping devices, opening the mold or bunch-holder for inserting the cigar-bunch or removing the finished cigar, and operating the devices for expelling paste from a holder or reservoir at proper periods.

The treadles C are arranged at the ends of the stand, and are pivoted at opposite corners thereof, so as to bring their free or pitman ends in a diagonal line with each other. The treadles C are provided with pitmen D, which are connected with balance and brake wheels E on the ends of a main shaft, G. The treadles C being arranged in the manner stated, they can be used either singly or together for actuating the main shaft. A pulley, $a$, on the main shaft receives a belt, $b$, which passes around an end pulley, $c$, of a longitudinal roller, H, having its bearings in suitable hangers or brackets, $d$, below the table-bed. Said roller H is fluted or channeled or otherwise roughened, and is arranged below a second roller, I, of a corresponding construction and length, this second roller being turned by the first roller and revolving in a contrary direction therefrom. A narrow endless belt, $H^3$, passing between the rollers H I, extends in an upward direction through a centrally-divided bunch-holder or mold, J, and from thence it runs in a downward direction under the bottom roller, H, so as to form a bight in the apron within the mold or bunch-holder J. The latter possesses a cylindrical interior chamber of the shape of a cigar, and is generally constructed of two curved end frames or arms connected by longitudinal bars, a pair of chambered blocks or shells, K L, and a series of rollers, M, of a small diameter, extending from said shells to the curved arms at the opposite ends of the machine. The mold may, however, be constructed of rollers extending the entire length between the end arms or frames, and in this instance the rollers are shaped so as to leave a chamber of the general shape of a cigar. The frames carrying the rollers are pivoted or hinged at their lower adjoining ends to suitable brackets or supports rising from the table-bed, and each frame of the mold or bunch-holder is, through the medium of toggle-arms M N, connected with a vertical rod, O, extending in a downward direction below the table, and connected at its lower end with a double treadle or foot-piece, P. By depressing said treadle from either side of the machine the mold or bunch-holder is moved through the intervention of the vertical rod and toggle-arms, so as to cause the end frames or arms of said bunch-holder to turn on their bottom pivots and permit their upper ends to recede from each other. In this manner the bunch-holder or mold is opened for permitting the cigar-bunch to be introduced or the finished cigar to be removed therefrom.

The narrow endless belt or apron $H^3$, passing through the center of the bunch-holder and over the free adjoining ends thereof, is generally guided in its movement by the two top rollers and one bottom roller of each frame of the bunch-holder, as is more fully shown in Fig. 3. When, however, cigars of a larger diameter are being wrapped, the apron is adjusted or pressed out by the increased diameter of the cigar-bunch, so as to travel in contact with one or more of the intermediate rollers of the bunch-holder, as will readily be understood. Each frame of the bunch-holder is provided with ears or lugs $f$ at each end thereof, through which pass horizontal stems $g$, connected by a longitudinal rod or shaft, $h$. Flanged collars Q, fitted on said shaft, and capable of sliding thereon, are arranged in pairs, so as to receive the endless apron between the same and hold it in the proper position in relation to the butt portion of the cigar-bunch, or the point where the wrapper is introduced into the bunch-holder. Set-screws $i$ or other suitable fastening devices are employed for retaining said collars Q in proper position on the shaft $h$. The apron is tightened through the medium of the aforesaid stems $g$, which can be adjusted in the lugs $f$ by loosening the set-screws $j$. In this manner effectual provision is made for tightening the apron, so as to cause it to properly sieze the wrapper and wind it around the cigar-bunch.

A revolving mandrel, R, projecting into the bunch-holder at the butt-end thereof, turns in the same direction as the endless apron and main shaft of the machine, and as said mandrel bears against the butt-end of the cigar-bunch it necessarily follows that the latter is also rotated or turned in the mold or bunch-holder for the object hereinafter stated. The mandrel R serves to define or regulate the length of the cigar, and for this purpose it may be provided at some suitable point thereon with a graduated scale indicating inches and fractions thereof.

As shown more fully in Fig. 7, the mandrel R is composed of two sections or parts, $r\ r'$, the section $r$ being provided with an outer end socket or bore, $r^2$, and a corrugated or roughened inner end, the other section fitting into the end socket and bearing against a suitable spring, $r^3$, arranged therein. The outer end of the mandrel-section $r'$ is journaled in a bearing, $s$, on the top of the table, and is capable of turning and sliding therein. A collar, $t$, encircling said mandrel-section $r'$ on the inner side of the bearing $s$, can be loosened so as to permit the mandrel to be adjusted, and by locking said collar $t$ to the mandrel through the medium of a set-screw or other device the mandrel-section is retained in position or prevented from sliding in its bearing. The section $r$ of the mandrel is connected with the other section, $r$, by means of a spline and feather, slot, and pin, or other device, so that it can slide but not turn thereon. A sleeve, S, on the end of the mandrel-section, $r'$, serves as a handle for adjusting the same or sliding it back and forth. Said sleeve also has an encircling ring, T, which is held at the outer end thereof by means of circumferential ribs or flanges, so that it cannot slide on the sleeve, the latter, however, being free to turn in said ring. An arm, T', extending vertically from said ring, projects through a slotted guide-plate, $T^2$, attached to the bearing of the mandrel or other part of the machine, and serves to actuate a registering mechanism, of any approved construction, whenever the section $r$ of the mandrel is pushed back on the other section, in order to remove a finished cigar from the mold. The register can thus be used for ascertaining the exact number of cigars made or finished by the machine.

A horizontal arm, $T^3$, adjustably fitted in the vertical arm T, will enable the parts which actuate the registering devices to be always in the proper operative position, whether the mandrel be in an advanced or retracted position.

A head or lateral enlargement, U, of the end of the bunch-holder or mold is provided with a vertical recess or socket, which receives a detachable tip-former or tip-finishing block, V. The latter has a socket or aperture, which adjoins the chamber of the bunch-holder or mold and receives the tip of the cigar-bunch. A slit, $v$, made in the top of the tip former or block, serves for the passage of the wrapper into the same, and vertical openings $x$, made in said block, intersecting with horizontal openings $y$, also made in the latter, serve to conduct paste or gum-water to the top of the block, so that the wrapper, in passing into the latter, will receive the paste on its under side. The openings in the tip-block communicate with openings in the head U, and said openings are connected with flexible tubes W, leading from the bottom of a paste reservoir or holder, X. The latter is generally composed of a cylindrical shell or bottle, fitted in a holding-frame, X', below the table-bed, and provided with a supply-tube, $X^2$. A piston fitted in said paste-reservoir has carrying-rods $X^3$, which are secured to a sliding cross-head, $X^4$. The latter moves in a guide-frame, $X^5$, on the top of the table, and a vertical screw-shaft, Y, passing through said guide-frame, works in the cross-head for depressing the latter and attached piston whenever the screw is turned. A ratchet-wheel, Y', on the upper end of the screw Y is arranged in proper relation to a pawl, $Y^2$, rising from the top of the table, and is connected by means of a vertical rod, $Y^4$, with an arm, $Y^5$, extending from one end of a rock-shaft, $Y^6$, having its bearings in hangers on the under side of the table. The other end of said rock-shaft has an arm, $Y^7$, which is connected with the upper end of a vertical rod, Z, carrying at its lower end a treadle or double foot-piece, Z'.

The rod Z, and likewise the rod of the mold-opening mechanism, are each provided with an encircling-spring, $z$, for returning these parts to their normal positions after pressure upon the treadles has been removed. Counterbalance-weights or other forms of springs than those herein shown may, however, be resorted to for the object last stated.

The paste-forcing machine above described may be dispensed with and the modified construction shown in Fig. 9 used in place of the same. In this instance an elastic or compressible air-bulb, $M^2$, arranged above or below the table, is provided with a tube, $m^3$, which leads into the top of the paste-reservoir. By compressing the bulb through the medium of the treadle Z' and the lever $M^4$, connected therewith, air is forced into the paste-reservoir for expelling paste therefrom in the manner and for the purpose already stated. The discharge-tubes are in either construction provided with suitable stop-cocks, so that the flow of the paste can be arrested.

It has already been stated that the mandrel, turning in contact with the butt of the cigar-bunch, revolves in the same direction as the endless apron. In this manner the cigar-bunch is turned by the joint action of the mandrel or regulator and the apron, and all liability of injury to the wrapper is effectually prevented. The mandrel also holds the cigar-bunch in proper position in the tip holder or block for making a perfect head. The roughened end of the mandrel will tend to take hold of the end of the cigar and prevent the slipping thereof.

In all cigar-machines depending solely upon a traveling apron for turning the cigar-bunch, in order to wind the wrapper thereon, the friction between said apron and bunch is frequently so great as to injure the wrapper, and in many instances thin or fine wrappers cannot be used at all.

By providing a revolving mandrel for turning the cigar-bunch I am enabled to use an apron of a softer or finer nature than has heretofore been employed, and I also obviate the breakage of the butt of the cigar-bunch, which is liable to occur with a stationary regulator bearing upon the butt of the cigar-bunch.

The devices for operating the mandrel generally consist of a pulley, $P^3$, a crossed elastic belt, $P^4$, and a pulley, $P^5$, of the lower corrugated roller. The crossed belt passes around the pulley $P^3$ on the mandrel and the pulley on the lower corrugated roller, and is made of india-rubber, spirally-coiled wire, or other elastic material. The object of an elastic belt is to permit the mandrel to be adjusted without arresting the rotary movement of the same.

Instead of the crossed elastic belt and the pulley on the lower corrugated roller, I may attach a pulley to the shaft of the upper roller and use a straight elastic belt for operating the mandrel. I may also locate a cannon or long pinion on the mandrel, which meshes into a spur-wheel on the upper corrugated roller. In this instance it will be obvious that the long pinion will permit the mandrel to be adjusted without taking it out of gear with the corrugated roller.

A machine constructed as above described is specially adapted for applying wrappers which are cut out in such a manner as to form a finished or closed tip without the use of a cutting mechanism for removing a surplus portion of the wrapper, as in machines heretofore known.

Having thus described my invention, what I claim as new, and desire to secure by Letters Patent, is—

1. In a cigar-machine, the bunch-holder or mold comprising two movable sections, constructed, essentially, of a series of rollers, and the stationary tip-former, in combination with the narrow endless apron passing through the center of the bunch-holder and around the upper free ends thereof, and the pair of friction and apron-driving rollers arranged below the bunch-holder and receiving the apron between the same, substantially as and for the purpose set forth.

2. In a cigar-machine, a positively-revolving mandrel adapted to bear against the butt of the cigar-bunch and turn in the same direction as the latter, in combination with a bunch-holder and a traveling apron passing through said bunch-holder and adapted to receive the cigar-bunch in a bight formed in the apron, substantially as and for the purpose set forth.

3. The longitudinally-adjustable mandrel or regulator and mechanism, substantially as described, for imparting a rotary movement thereto, in combination with the bunch-holder or mold, and the endless apron passing through the latter and forming a bight therein, substantially as and for the purpose set forth.

4. The mandrel or regulator consisting of two sections fitted one into the other, the end collar, and the sleeve for adjusting the mandrel, in combination with suitable bearings and driving-gearing, and the bunch-holder and endless apron, as and for the purpose set forth.

5. The combination of the revolving adjustable mandrel or regulator, the encircling-ring or loose sleeve having an arm provided with an adjustable end finger, with a registering mechanism, a bunch-holder, and an endless apron passing through the latter, substantially as and for the purpose herein set forth.

6. The combination of the bunch-holder, comprising two movable sections, hinged at their lower adjoining ends and adapted to advance and recede from each other at the top thereof, the toggle-arms, and the vertical rod carrying double foot-piece, with a suitable table or frame and the endless traveling apron passing through the bunch-holder, substantially as and for the purpose set forth.

7. The combination of the outwardly-adjustable arms $g$, cross-bar $h$, and the longitudinally-adjustable collars Q with the bunch-holder and the endless apron, as and for the purpose set forth.

8. The combination of the paste-holder, mechanism, substantially as described, for expelling the paste therefrom in an intermittent manner, the tip former or block having a top slot and intersecting vertical and horizontal channels for conducting the paste to the surface of said block, and the supply-tubes communicating with said channels and the paste-holder, with the table, the bunch-holder, and the endless apron passing through the latter, as and for the purpose set forth.

9. A cigar-machine having two power-treadles, a single main shaft, and a pair of double treadles or foot-pieces, and vertical rods, in combination with a bunch-holder, endless apron, and paste-supplying mechanism, as and for the purpose set forth.

10. In a cigar-machine, the combination of a detachable tip former or block having a recess and a top slit and paste-channels, with a recessed head or laterally-elongated end of a bunch-holder, and an endless apron operating in said bunch-holder, as and for the purpose set forth.

In testimony whereof I affix my signature in presence of two witnesses.

JOHN E. SCHMALZ.

Witnesses:
THOS. E. BADEN,
WM. TANNER.